United States Patent
Spoerke et al.

(10) Patent No.: US 9,988,312 B2
(45) Date of Patent: Jun. 5, 2018

(54) CATION-ENHANCED CHEMICAL STABILITY OF ION-CONDUCTING ZIRCONIUM-BASED CERAMICS

(71) Applicant: National Technology & Engineering Solutions of Sandia, LLC, Albuquerque, NM (US)

(72) Inventors: Erik David Spoerke, Albuquerque, NM (US); Paul G. Clem, Albuquerque, NM (US); Jill S. Wheeler, Albuquerque, NM (US); Leo J. Small, Albuquerque, NM (US); Jon Ihlefeld, Charlottesville, VA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days. days.

(21) Appl. No.: 15/460,570

(22) Filed: Mar. 16, 2017

(65) Prior Publication Data
US 2017/0275208 A1  Sep. 28, 2017

Related U.S. Application Data

(60) Provisional application No. 62/311,523, filed on Mar. 22, 2016.

(51) Int. Cl.
| | |
|---|---|
| *C04B 35/48* | (2006.01) |
| *C04B 35/447* | (2006.01) |
| *C01G 25/00* | (2006.01) |
| *C01G 27/00* | (2006.01) |
| *C04B 35/16* | (2006.01) |
| *C04B 41/00* | (2006.01) |

(52) U.S. Cl.
CPC .......... *C04B 35/481* (2013.01); *C01G 25/006* (2013.01); *C01G 27/006* (2013.01); *C04B 35/16* (2013.01); *C04B 35/447* (2013.01); *C04B 35/48* (2013.01); *C04B 41/00* (2013.01); *C01P 2002/50* (2013.01); *C01P 2004/80* (2013.01); *C04B 2235/3201* (2013.01); *C04B 2235/3203* (2013.01); *C04B 2235/3227* (2013.01); *C04B 2235/3244* (2013.01); *C04B 2235/447* (2013.01)

(58) Field of Classification Search
CPC .... C04B 2235/3203; C04B 2235/3227; C04B 2235/441; H01M 2300/0068
See application file for complete search history.

(56) References Cited

U.S. PATENT DOCUMENTS

| | | | | |
|---|---|---|---|---|
| 7,918,986 | B2 * | 4/2011 | Balagopal | B01D 61/44 205/450 |
| 9,034,525 | B2 * | 5/2015 | Babic | C04B 35/486 429/206 |

(Continued)

OTHER PUBLICATIONS

Kumazaki et al. High lithium ion conductive Li7La3Zr2O12 by inclusion of both Al and Si. High lithium ion conductive Li7La3Zr2O12 by inclusion of both Al and Si.*

(Continued)

*Primary Examiner* — Noah S Wiese
(74) *Attorney, Agent, or Firm* — Kevin W. Bieg (57) ABSTRACT

At least partial substitution of zirconium by hafnium in ion-conducting zirconium-based ceramics provides enhanced chemical stability in alkaline and acid environments.

10 Claims, 6 Drawing Sheets

(56) References Cited

U.S. PATENT DOCUMENTS

| | | | | |
|---|---|---|---|---|
| 2009/0092903 A1* | 4/2009 | Johnson | ............... | H01M 4/0471 |
| | | | | 429/322 |
| 2015/0214555 A1* | 7/2015 | Visco | ................. | H01M 4/5815 |
| | | | | 429/347 |
| 2015/0364787 A1* | 12/2015 | Zhang | ............... | H01M 10/0562 |
| | | | | 429/321 |

OTHER PUBLICATIONS

Berry et al. Synthesis and characterisation of Cr3+-containing NASICON-related phases. Solid State Ionics 177 (2006) 2889-2896.*

Lithium Lanthanum Zirconate. American Elements website. https://www.americanelements.com/lithium-lanthanum-zirconate. Retrieved Oct. 2, 2017.*

Cretin, M. et al., "NASICON Structure for Alkaline Ion Recognition", Sensors and Actuators B 43 (1997), pp. 224-229.

Bykov, D.M. et al., "Multivalent ionic conductivity in the series of phosphates $La_xYb_{1/3-x}Zr_2(PO_4)_3$ with NASICON structure", Solid State Ionics 182 (2011), pp. 47-52.

\* cited by examiner

FIG. 6

CATION-ENHANCED CHEMICAL STABILITY OF ION-CONDUCTING ZIRCONIUM-BASED CERAMICS

CROSS-REFERENCE TO RELATED APPLICATION

This application claims the benefit of U.S. Provisional Application No. 62/311,523, filed Mar. 22, 2016, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to ion-conducting ceramics and, in particular, to cation-enhanced chemical stability of zirconium-based ceramics.

BACKGROUND OF THE INVENTION

NaSICON (Na Super Ion CONductor) is a ceramic material with a nominal composition of $Na_{1+x}Zr_2P_{3-x}Si_xO_{12}$ known to selectively transport sodium ions at extremely high rates (>$10^{-3}$ S/cm at room temperature) through atomic channels formed between zirconia octahedra and phosphate or silica tetrahedra within its crystal structure. Depending on the chemical and crystallographic modifications of these materials, they can be engineered to selectively promote or inhibit ion transport based on ion size or charge, making this a particularly versatile and potentially important ceramic material system. Although NaSICON in its varied forms has found widespread application in energy storage, chemical separations, sensors, and other technologies, it suffers from potentially significant chemical instabilities. One of the potential sources of instability in these materials, particularly in aqueous environments, is the Zr—O bonds that make up much of the NaSICON lattice structure. For example, in pure zirconium oxide systems these materials would be expected to be significantly soluble in both acidic (below pH 4) and basic (above pH 12) environments. This instability prevents these types of materials from finding significant applications, for example as separators for alkaline sodium battery chemistries.

According to the present invention, the introduction of cationic substitutions for the Zr ion can stabilize these ceramic materials under these environments, potentially expanding their applicability.

SUMMARY OF THE INVENTION

The present invention is directed to cation-enhanced chemical stability of ion-conducting zirconium-based ceramics. For example, a hafnium-substituted zirconium-based ceramic can comprise $Na_{1+x}Zr_2P_{3-x}Si_xO_{12}$, wherein Zr is at least partially substituted by Hf. For example, the zirconium-based ceramic can comprise a completely substituted $Na_{1+x}Hf_2P_{3-x}Si_xO_{12}$. The hafnium-substituted, ion-conducting zirconium-based ceramic can be coated onto another ion-conducting material, such as $Na_3Zr_2P_3O_{12}$ or $Na_3Zr_2PSi_2O_{12}$, to provide a protective shield for the less stable underlying material.

BRIEF DESCRIPTION OF THE DRAWINGS

The detailed description will refer to the following drawings, wherein like elements are referred to by like numbers.

DETAILED DESCRIPTION OF THE INVENTION

Figure 1A:
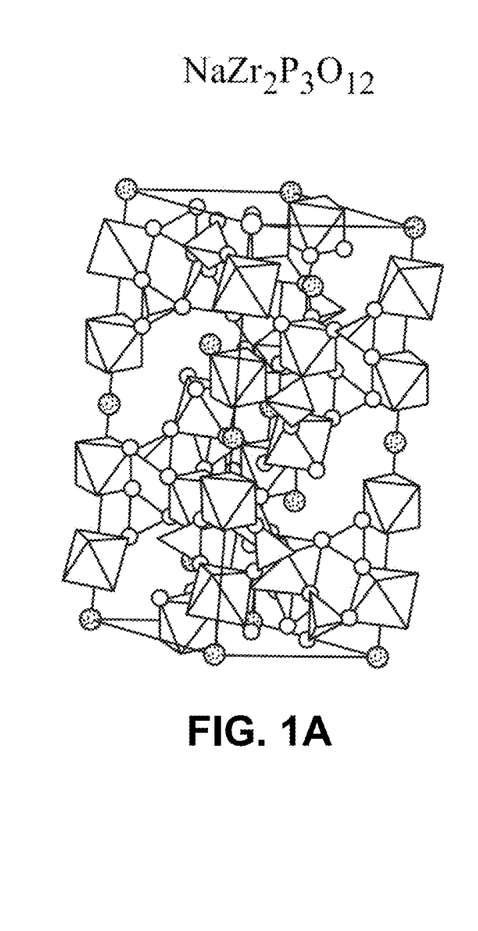
FIG. 1A is a schematic illustration of the molecular structure of $NaZr_2P_3O_{12}$ showing zirconia octahedra, phosphate tetrahedra, oxygen (small spheres), and sodium (large spheres).
Figure 1B:
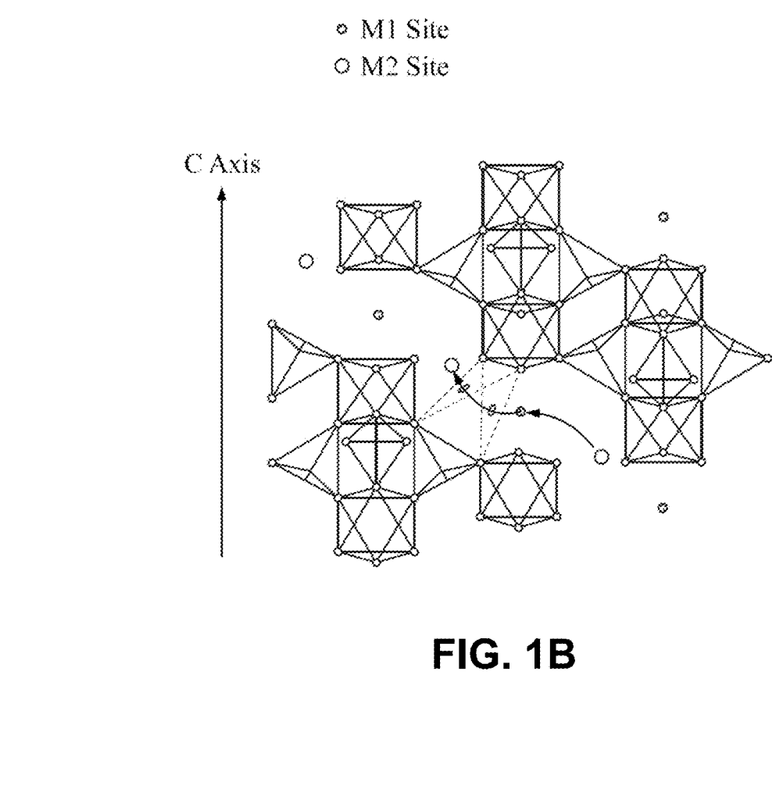
FIG. 1B is a schematic illustration of the NaSICON structure showing a pathway for ion conduction.

The present invention is directed to materials that modify the chemical stability of zirconium-based ceramics through cation substitutions for the zirconium ions. For example, cations can be substituted for Zr in the sodium-ion conductor, NaSICON. The term NaSICON (Na Super Ion CONductor) commonly refers to the ion-conducting ceramic $Na_{1+x}Zr_2P_{3-x}Si_xO_{12}$. As shown in FIG. 1A, these materials form a rigid hexagonal framework of corner-linked $ZrO_6$ octahedra and $PO_4$ or $SiO_4$ tetrahedra and containing so-called M1 and M2 interstitial positions which are typically filled with alkali cations, such as sodium. See M. Cretin et al., *Sensors and Actuators B* 43, 224 (1997). As shown in FIG. 1B, the conduction of alkali cations through NaSICON-type materials is based on the movement of the ion from site to site through the crystal lattice via channels (bottlenecks) constricted by zirconia octahedra and phosphate or silica tetrahedra. As a result, ion conductivity through this matrix depends strongly on both the size of these conduction channels and the size of the mobile alkali cation. See D. Bykov et al., *Sol. St. Ionics* 182, 47 (2011). This conductivity is also affected by any electrostatic or covalent attraction between the mobile cation and the surrounding crystalline framework of the NaSICON structure.

The invention substitutes hafnium ($Hf^{4+}$) for $Zr^{4+}$ in the NaSICON crystal structure, resulting in a considerable increase in aqueous ceramic stability. Like Zr, Hf exists as a tetravalent cation, and is very similar in ionic size and electronegativity. These similarities mean that little or no impact on the crystal structure or ion-transport properties of the material is expected. The chemical stability of the Hf—O bonds, however, can be dramatically different. Based on the known behaviors of $ZrO_2$ and $HfO_2$, Hf—O bonds are expected to be slightly more stable in the range pH 1-4, but much more stable at elevated pH (e.g., above 12). See M. Pourbaix, *Atlas of Electrochemical Equilibria in Aqueous Solutions, Tran*, National Association of Corrosion Engineers, Houston, Tex. (1974). Therefore, the description below focuses primarily on the alkaline stability of Hf-substituted NaSICON structure.

Figures 2A, 2B:
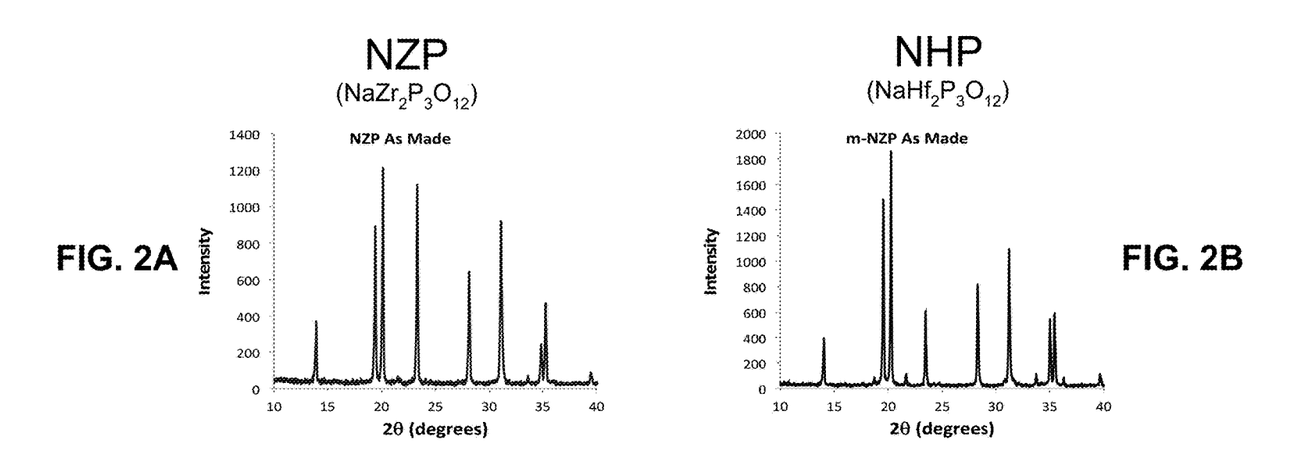
FIGS. 2A and 2B show X-ray diffraction patterns for NZP and NHP ceramic powders as synthesized, respectively.
Figure 2C:
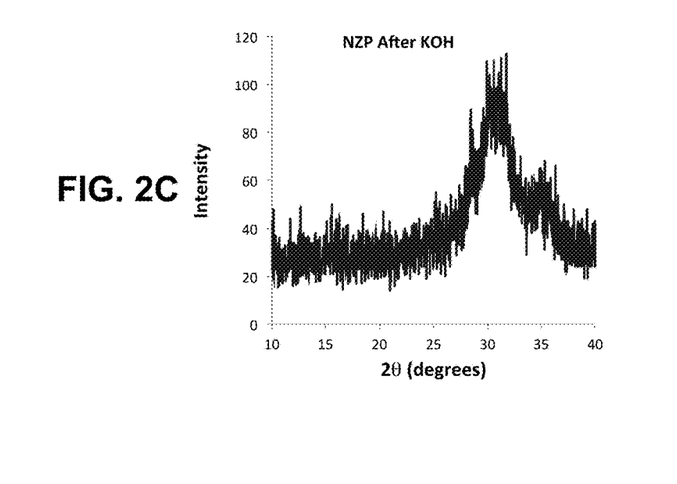
FIGS. 2C and 2D show X-ray diffraction patterns for NZP and NHP ceramic powders after 72 hours at 80° C. in 10M KOH, respectively.
Figure 2D:
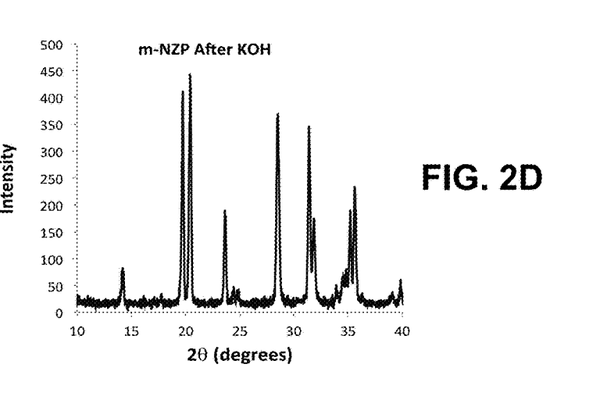

The example described below uses the Si-free x=0 formulation, $NaZr_2P_3O_{12}$, of the generic NaSICON formulation. In FIGS. 2A and 2B are shown the x-ray diffraction patterns for as-synthesized NZP ($NaZr_2P_3O_{12}$) and NHP ($NaHf_2P_3O_{12}$). Both materials show strongly crystalline diffraction peaks for each of the respective materials (there is a small amount of secondary phase $HfP_2O_7$ evident in the NHP pattern). These as-made powders were placed in 10M aqueous potassium hydroxide (KOH) at 80° C. for 72 hours. The powders were subsequently collected, washed, dried, and reexamined by x-ray diffraction. The alkaline-exposed patterns are shown in FIGS. 2C and 2D. Clearly, after this alkaline exposure, the NZP crystal lattice, containing Zr—O bonds, has been destroyed. After exposure, there remains no evidence of the crystalline diffraction seen in the as-made material—only an amorphous phase and a small amount of crystalline $ZrO_2$ that likely formed during washing with water below pH 12 to remove the excess KOH. In contrast, the NHP material, containing Hf—O bonds instead of Zr—O bonds, still shows strong crystallographic diffraction, indicating that the crystal structure remains intact. A very small amount of $HfO_2$ is also present, which is believed to be the result of precipitation from dissolved trace $HfP_2O_7$ seen in the as-made material, but not seen after alkaline exposure. This dramatic difference is strong evidence supporting the Hf-stabilization of the NaSICON material in aqueous alkaline conditions.

Figure 3:
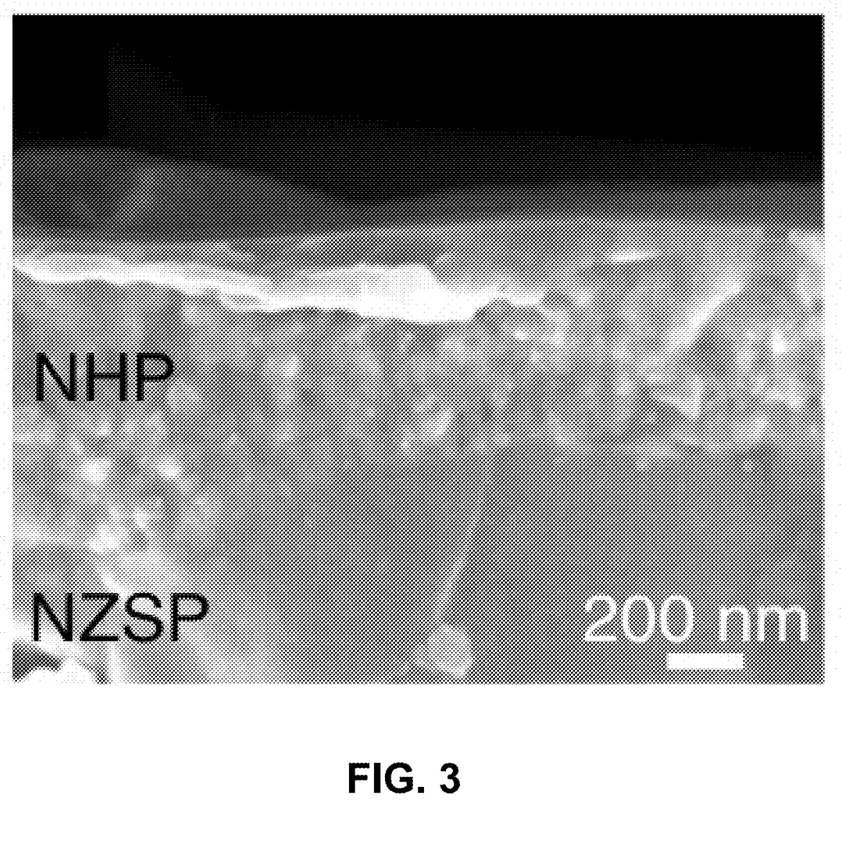
FIG. 3 is a scanning electron micrograph of a cross-section of a thin film of NHP coating a commercial NZSP NaSICON pellet.

This improved stability described above used bulk powders of NHP. However, the stabilizing influence of the NHP can also be realized when applied as a protective layer to other ion-conducting materials that may be susceptible to other mechanisms of degradation. For example, the highly conductive x=2 formulation of NaSICON ($Na_3Zr_2PSi_2O_{12}$, or NZSP) is susceptible to alkaline degradation both through Zr—O and Si—O vulnerabilities in the crystal lattice. A protective NHP thin film can be applied to an existing NZSP-based ceramic. Using a multi-stage sol-gel coating process, thin films of NHP was coated on commercially-obtained NZSP pellets, as shown in FIG. 3. A metallic electrode was attached to the back of the pellet, and the NHP-coated "front" of the pellet was exposed to 10M aqueous KOH at 80° C. through a gasketed glass fixture. The open circuit potential (OCV) measured between the back electrode on the pellet and an electrode immersed in the KOH solution was monitored over time. An abrupt change in the OCV indicated that the KOH had etched through the NaSICON pellet. Proof-of-principle studies revealed that the lifetime of the pellets could be extended from 4.3 hours using an uncoated pellet to 36 hours using an NHP-coated pellet. This dramatic increase in pellet lifetime under extremely aggressive etching conditions shows that this stabilized NHP material can be used not only as a bulk ion-conducting material, but also as an ion-conducting thin film protective "shield" on other, more vulnerable materials.

Figure 4A:
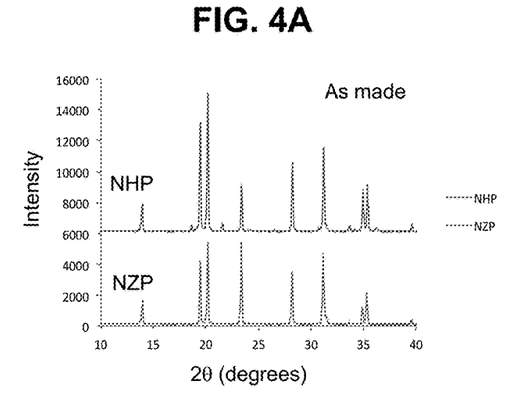
FIG. 4A is an X-ray diffraction pattern for NZP and NHP ceramic as made powders.
Figure 4B:
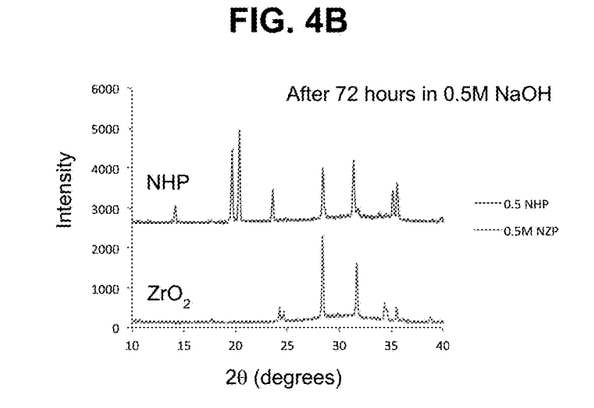
FIG. 4B is an X-ray diffraction pattern for NZP and NHP ceramic powders after 72 hours in 0.5M NaOH.
Figure 4C:
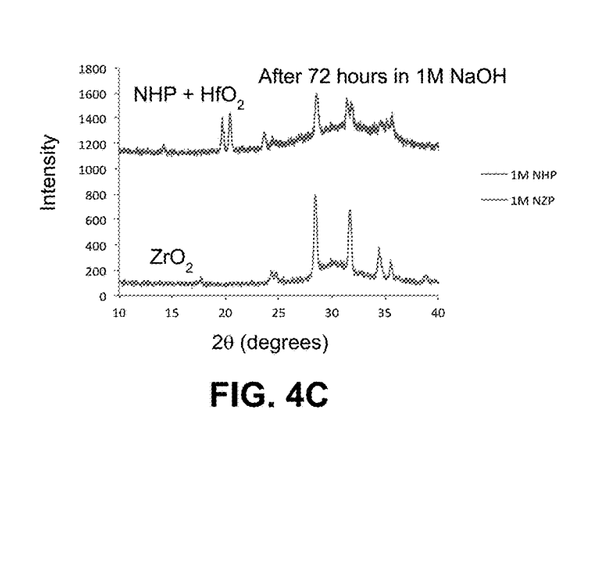
FIG. 4C is an X-ray diffraction pattern for NZP and NHP ceramic powders after 72 hours in 1M NaOH.
Figure 4D:
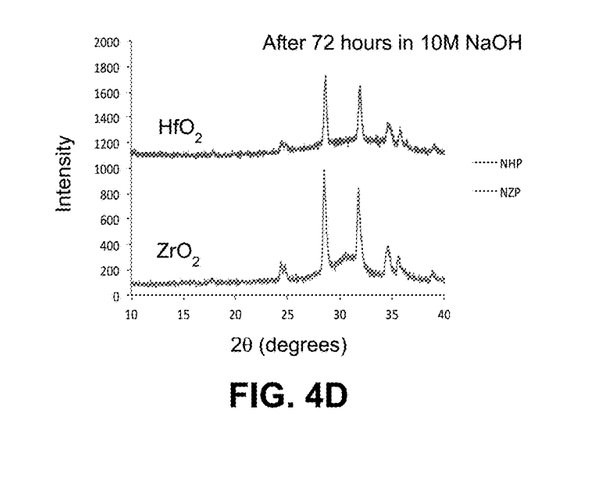
FIG. 4D is an X-ray diffraction pattern for NZP and NHP ceramic powders after 72 hours in 10M NaOH.

Further studies of these materials showed that the improved stability can be realized in alkaline media of different compositions, where issues such as ion-exchange can be relevant. For example, as illustrated in the XRD patterns shown in FIG. 4D, exposure of the NZP and NHP to 10M NaOH at 80° C. for 72 hours revealed that both materials were decomposed, resulting in $ZrO_2$ and $HfO_2$ decomposition byproducts, respectively. However, FIG. 4C shows that if the NaOH concentration was reduced to 1M (pH 14), the NZP still completely decomposed to $ZrO_2$, but the NHP resulted in a mix of NHP and $HfO_2$, indicating improved NHP stability even when ion-exchange is believed to be a contributing degradation mechanism. As shown in FIG. 4B, when the concentration was reduced to 0.5M (pH>13), while the NZP clearly still decomposed to $ZrO_2$, the NHP appeared to be largely intact with strong crystalline NHP peaks evident. This is compelling evidence for the improved stability of NHP in select, still strongly alkaline, concentrations of NaOH.

Figure 5A:
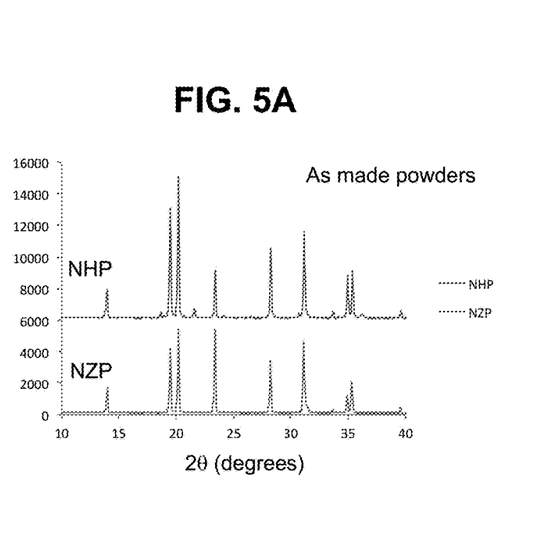
FIG. 5A is an X-ray diffraction pattern for NZP and NHP ceramic as made powders.
Figure 5B:
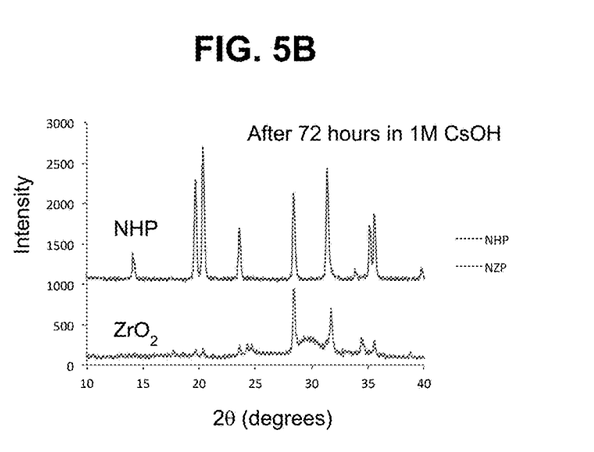
FIG. 5B is an X-ray diffraction pattern for NZP and NHP ceramic powders after 72 hours in 1M CsOH.
Figure 5C:
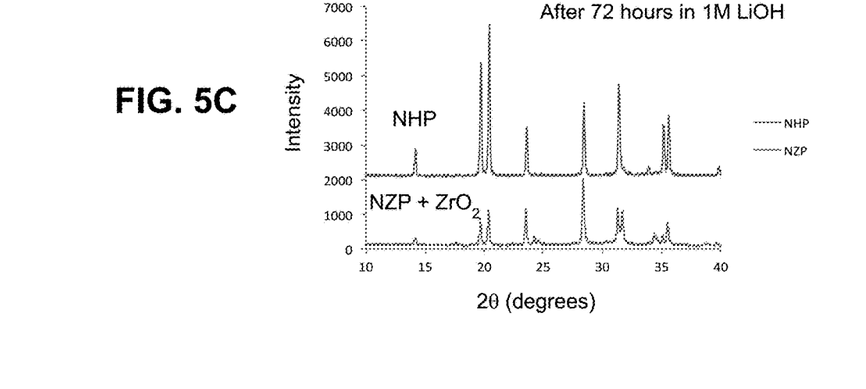
FIG. 5C is an X-ray diffraction pattern for NZP and NHP ceramic powders after 72 hours in 1M LiOH.

Similar tests were performed using 1M CsOH and 1M LiOH (at 80° C. for 72 hours) each introducing alkaline cations of different sizes, relative to KOH and NaOH. As seen in the XRD patterns in FIGS. 5B and 5C, the NHP retained its crystallinity in both the 1M CsOH and 1M LiOH solutions, while the NZP analog decomposed almost entirely to $ZrO_2$ in the CsOH test, and partially decomposed in the 1M LiOH tests, forming a mix of NZP and $ZrO_2$. These examples again provide compelling evidence for the improved stability of the NHP phase in a variety of alkaline environments.

Figure 6:
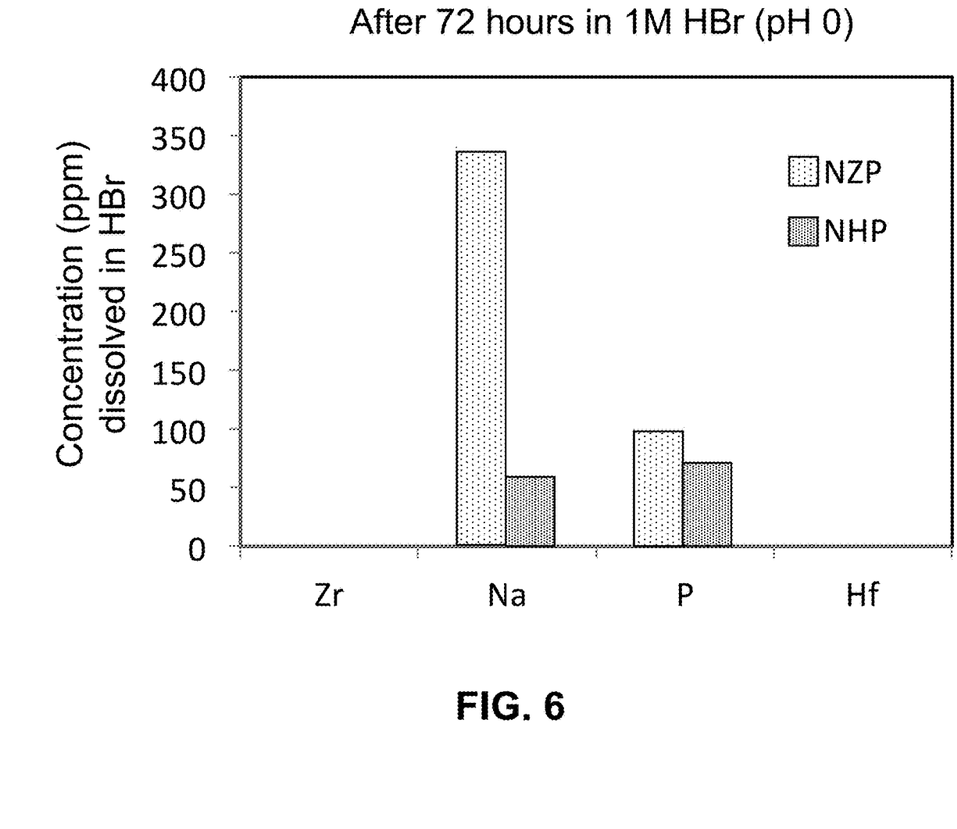
FIG. 6 is a bar graph showing the concentrations of dissolution products of NZP and NHP ceramic powders after 72 hours in 1M HBr.

Although most of these demonstrations focused on improved stability in alkaline environments, preliminary evidence also indicates improved NHP stability in acidic environments. NZP and NHP powders were placed in aqueous HBr at pH=0 (80° C. for 72 hours). The resulting dissolution is shown in FIG. 6. Although the decomposition was not as dramatic under acidic conditions, elemental analysis of dissolved species in the HBr solution showed an increase in the concentrations of dissolved sodium (Na) and phosphorus (P) dissolved from the NZP lattice. The increased solubility from the NZP indicates that not only is the NHP more stable in alkaline media, but it also provides improved stability in aggressive acidic media.

Although this example used NaSICON, the invention can be applied to essentially any Zr-based ceramic. For example, the lithium ion conductor lithium lanthanum zirconate (LLZO, $Li_7La_3Zr_2O_{12}$) is another ion-conducting candidate that can benefit from cation substitution. Further, while this example used NZP, the method can be adapted for a variety of Zr-based ceramics or ceramic glasses subject to degradation in aqueous environments.

The present invention has been described as cation-enhanced chemical stability of zirconium-based ceramics. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An ion conducting ceramic comprising $Na_{1+x}HF_2P_{3-x}Si_xO_{12}$.

2. The ion-conducting ceramic of claim 1, wherein x=0.

3. A protective layer comprising an ion-conducting zirconium-based ceramic, wherein the zirconium is at least partially substituted by hafnium, that is coated onto another ion-conducting material comprising $Na_3Zr_2PSi_2O_{12}$ that is susceptible to a different mechanism of degradation than the protective layer.

4. A protective layer comprising an ion-conducting zirconium-based ceramic, wherein the zirconium is at least partially substituted by hafnium, that is coated onto another ion-conducting material comprising $Na_3Zr_2P_3O_{12}$ that is susceptible to a different mechanism of degradation than the protective layer.

5. A protective layer comprising an ion-conducting zirconium-based ceramic, wherein the zirconium is at least partially substituted by hafnium, that is coated onto another ion-conducting material comprising $Na_{1+x}Zr_2P_{3-x}Si_xO_{12}$, wherein Zr is at least partially substituted by Hf, that is susceptible to a different mechanism of degradation than the protective layer.

6. The protective layer of claim 5, wherein $x=0$.

7. A protective layer comprising $Na_{1+x}Hf_2P_{3-x}Si_xO_{12}$ that is coated onto another ion-conducting material that is susceptible to a different mechanism of degradation than the protective layer.

8. The protective layer of claim 7, wherein $x=0$.

9. The protective layer of claim 7, wherein the other ion-conducting material comprises $Na_3Zr_2PSi_2O_{12}$.

10. The protective layer of claim 7, wherein the other ion-conducting material comprises $Na_3Zr_2P_3O_{12}$.

* * * * *